US009576230B2

(12) United States Patent
Rezende (10) Patent No.: US 9,576,230 B2
(45) Date of Patent: Feb. 21, 2017

(54) DOT CODE PATTERN FOR ABSOLUTE POSITION AND OTHER INFORMATION USING AN OPTICAL PEN, PROCESS OF PRINTING THE DOT CODE, PROCESS OF READING THE DOT CODE

(76) Inventor: Marcelo Amaral Rezende, Florianópolis (BR)

( * ) Notice: Subject to any disclaimer, the term of this patent is extended or adjusted under 35 U.S.C. 154(b) by 196 days.

(21) Appl. No.: 13/155,990

(22) Filed: Jun. 8, 2011

(65) Prior Publication Data
US 2012/0006898 A1    Jan. 12, 2012

Related U.S. Application Data

(60) Provisional application No. 61/398,891, filed on Jul. 6, 2010.

(51) Int. Cl.
| | |
|---|---|
| G06K 7/10 | (2006.01) |
| G06K 9/36 | (2006.01) |
| G06K 9/80 | (2006.01) |
| G06K 19/06 | (2006.01) |
| G06F 3/03 | (2006.01) |
| G06F 3/0354 | (2013.01) |

(52) U.S. Cl.
CPC ....... *G06K 19/06037* (2013.01); *G06F 3/0321* (2013.01); *G06F 3/03545* (2013.01)

(58) Field of Classification Search
CPC .... G06K 15/02; G06K 7/1093; G06K 15/128; G06K 2215/0045; G06K 2215/0071; G06K 7/10722; G06K 7/10861; G06K 7/14; G06K 15/00; G06K 15/1223; G06K 17/0009; G06K 2215/0008; G06K 2215/0014; A42B 1/24; H04N 2201/04703; H04N 1/193; G06F 17/2235; G06F 17/248; G06F 17/272; G06F 17/30899; G06F 3/0484; G06F 8/65; G06F 17/214
USPC ............................. 235/462.01, 494, 462.07
See application file for complete search history.

(56) References Cited

U.S. PATENT DOCUMENTS

| | | | |
|---|---|---|---|
| 4,416,633 A * | 11/1983 | Gulack ................... | A42B 1/24 283/117 |
| 5,051,736 A | 9/1991 | Bennett et al. | |
| 5,896,489 A * | 4/1999 | Wada ............................. | 358/1.2 |
| 5,897,669 A * | 4/1999 | Matsui ..................... | 235/462.07 |
| 6,186,405 B1 | 2/2001 | Yoshioka | |
| 6,667,695 B2 | 12/2003 | Pettersson et al. | |
| 6,674,427 B1 * | 1/2004 | Pettersson et al. ........... | 235/494 |
| 6,959,866 B2 | 11/2005 | Takahashi et al. | |
| 6,965,377 B2 | 11/2005 | Yanagisawa et al. | |

(Continued)

OTHER PUBLICATIONS

Wikipedia.org, "Binary Number", Jun. 29, 2010.*

*Primary Examiner* — Thien T Mai
(74) *Attorney, Agent, or Firm* — John J. Penny, Jr.

(57) ABSTRACT

A manufacture for encoding information from which a position of an optical pen tip can be derived, said manufacture includes a display medium having a supporting base and upon which is encoded a two dimensional code pattern that is continuously arranged on an entire surface of the supporting base; wherein the pattern is formed by a sequence of narrow parallel bands, including at least two parallel lines, of which one line is a base line the remaining lines are secondary lines; wherein each narrow parallel band includes a sequence of dots, the dots being arranged in a predetermined position in order to represent a number at a selected number base.

16 Claims, 8 Drawing Sheets

(56) References Cited

U.S. PATENT DOCUMENTS

| | | |
|---|---|---|
| 7,006,134 B1 | 2/2006 | Arai et al. |
| 7,048,198 B2 | 5/2006 | Ladas et al. |
| 2010/0133351 A1* | 6/2010 | Yoshida ........................ 235/494 |

* cited by examiner

If we are using paper as the encoded subtract you can pick the dots size starting at 42 microns, to fit the printer resolution. In a printed document with this pattern, the distance between two narrow bands could vary.

The distances are choose, so is possible to insert a code line between two consecutive "text lines".

That variation is limited by the image region set in the Camera in the optical Pen.

To achieve good spatial tip pen localization, it is better to have at least two bands segments pattern inside each image frame.

FIG. 5

Empresa Inovadora (Prime) foi apresentado no dia
s-âncora que ficarão responsáveis pela seleção
um ano, a Agência do Ministério da Ciência e
anos de vida. A meta do programa é ajudar na
s e serviços.
ançado pelos parceiros nos estados com
Cada incubadora também vai operar com recursos
ados pela FINEP. No cálculo, foram levadas em
ções parceiras. A maioria, no entanto, receberá o

DOT CODE PATTERN FOR ABSOLUTE POSITION AND OTHER INFORMATION USING AN OPTICAL PEN, PROCESS OF PRINTING THE DOT CODE, PROCESS OF READING THE DOT CODE

RELATED APPLICATION

This application claims the benefit of the priority date of U.S. Provisional Application 61/398,891, filed on Jul. 6, 2010, the contents of which are herein incorporated by reference.

FIELD OF DISCLOSURE

This disclosure relates to pattern recognition, and in particular, to methods and systems for positioning an optical pen or stylus.

BACKGROUND

In several cases, users prefer to interact with a computer using an electronic pen or stylus instead of mouse or keyboard. For example, when a user needs to compose a handwritten document on a paper or a whiteboard. One difficulty associated with a handwritten document is that of archiving it into digital form providing a way to edit this archived version. Prior art approaches typically involve scanning the document.

Some methods and systems rely on a pattern to analyze an encoded surface and to determine localize a pen. Those existing patterns have some disadvantages. Among these are:
1. Existing patterns have an excessively high number of dots per unit area (i.e. too high a dot density).
2. Dots used in known dot patterns tend to be too small to be correctly printed using a typical home printer.
3. Known dot patterns tend to distract a reader, thus making reading a document more difficult.
4. The document cannot be printed at same time as the dot pattern.
5. Know dot patterns distribute dots evenly on the paper.

For a pattern with a high dot density, the image analysis is difficult enough so that the device position cannot be returned in real time using a low cost and low power processor. Additionally, where the dots are small (i.e. about 50 microns in diameter) the dot pattern is very noise susceptible. Thus, any dirt on the paper or substrate makes it difficult for a pen to read the dot pattern.

The inability to print the dot pattern and the document concurrently is of particular significance. In the prior art, one first prints a pattern on the paper. Then, one prints the document over the already-printed pattern. A difficult that can arise is a mismatch in alignment between the pattern and the document. To overcome this difficulty, the document is often printed with a special ink to avoid covering the pattern.

Another disadvantage of the prior art is that the user is obligated to press the pen against the paper to allow the pattern is recognized. This means that the pen includes mechanical parts and sensors in the pen to detect when the pen's tip contacts the paper, causing several problems in relation to the pattern recognition.

SUMMARY

The present invention is related to a printable dot code pattern, and a process (rule-software) to print any digital document with this specific code without any changes on its readability, as well as a process for an optical device to read (image analysis) the information from the dot code. The information will include at least the device spatial absolute position. When the dot code is printed together with a digital document it will appear, to the user, as if it were printed on ruled paper. This information will be sent or archived to a different device using a codec.

In one aspect, the invention features a manufacture for encoding information from which a position of an optical pen tip can be derived. Such a manufacture includes a display medium having a supporting base and upon which is encoded a two dimensional code pattern that is continuously arranged on an entire surface of the supporting base; wherein the pattern is formed by a sequence of narrow parallel bands, including at least two parallel lines, of which one line is a base line the remaining lines are secondary lines; and wherein each narrow parallel band includes a sequence of dots, the dots being arranged in a pre-determined position in order to represent a number at a selected number base.

In some embodiments, the sequence of dots represents numbers, each of which is a number of a column.

In other embodiments the sequence of dots represents numbers, each of which is a number of a line.

In yet other embodiments, the distance between the orthogonal projection of the dots over the base line is about 500-650 microns.

Other embodiments include those in which the distances between parallel lines is a constant of about 100-150 microns, and those in which the dot diameters are between 100-150 microns.

In certain other embodiments, the dot size is selected so that screen physical pixel structures on the display medium will appear as noise on a camera image frame obtained by a camera in an optical pen.

In another aspect, the invention features a process for encoding a dot code pattern onto a substrate. Such a process includes opening a digital document containing an image; looking for spaces between text lines, horizontal lines and pictures in said image; inserting said dot code pattern in spaces between text lines; identifying lines extending along a selected axis of said document, and exchanging said lines with encoded lines.

Some practices also include inserting, at a selected location in the document, an extra dot code containing document specific information to be read by an optical pen.

Other practices include surrounding selected dots with lines of infra-red invisible ink.

Yet other practices include identifying oriental characters in the document and selecting said axis to be a vertical axis.

In yet another aspect, the invention features a process for reading a dot code pattern encoded on a substrate along a narrow band. Such a process includes causing an optical pen to take pictures of the dot code pattern, as the pen moves over a surface of the substrate, said pictures being taken at a rate from 60 to 100 frames per second; and analyzing each frame by localizing the dots in the dot code pattern by using a mask configured to fit images of dots and to exclude images of characters; based at least in part on the localizing the dots, identifying the narrow band; reading coordinates encoded by the dot code pattern; and localizing the surface plane based at least in part on said coordinates.

In some practices, identifying the narrow band comprises, selecting, as a direction of the narrow band, a direction along which the dots have the greatest frequency, said selecting comprising inspecting a projection of all dots in a set of localized dots onto a line normal to a candidate direction, identifying dots from said set that are within a width of the narrow band; removing the identified localized dots from the set; and repeating the selecting, inspecting, and identifying steps for the remaining dots in the set.

In other practices, identifying the narrow band comprises defining a graph having vertices are those dots and the edges are formed by a par of such vertices say P1 and P2 that its distance are in the expected range that is Limit Inf<Dist(P1, P2)<Limit Sup and taking the connected compounds of this graph.

In yet other practices, reading coordinates encoded by the dot code pattern comprises localizing the frame in the encoded surface.

Additional practices include those in which a location of a dot is expressed in first and second coordinates, and wherein reading the coordinates further comprises identifying the first coordinate of a starting dot and identifying a direction in which the second coordinate of the starting dot increases.

Yet other practices include those in which localizing the surface plane comprises locating the plane based at least in part on the distances first and second points on the substrate surface, said first and second points on the substrate surface corresponding to first and second points on an image of the dot code pattern.

Among the other practices of the process are those in which localizing the surface plane comprises determining if the optical pen is in contact with the surface of the substrate.

DETAILED DESCRIPTION

The embodiments of the present invention will resolve all and other disadvantages of existing prior art. Among other things, this is a system and process for encoding the pattern of dots on a surface, printing the document with the encoded pattern and decoding the pattern.

The pattern may represent a spatial position of an optical pen, or identify commands for document management, links or other data. It is also possible to send information to the pen to change the way the pen operates with the encoded pattern.

Processes and system embodiments of the present invention are economically and commercially feasible, easier to implement and easier to use than those in the prior art.

A first embodiment of the invention permits a user to select any printable document using rule-software. The printed document will appear with added "ruled lines", similar to those present on a document printed on a ruled paper. If the document already has "ruled lines" the software could exchange those lines to "pattern lines". The user could change the "lines" position or add/remove these "lines".

The rule-software could add other information, for instance, a document identification code on an upper right side of the document. When users print documents, what appear to be only ruled lines will be in fact encode a dot code pattern disguised as a rule line.

If a user handwrites over a copy of the printed document copy using a special optical pen, the pen uses image analysis techniques to read, from the encoded pattern, at least the pen's absolute spatial position. The absolute coordinate can be archived or transmitted to a computer in real time. The rule-software receives data from the pen and locates the document on the computer, and adds ink strokes at the appropriate locations on this document, thereby creating a digital version of the printed document as the user marks it with an optical pen.

In another embodiment, which effectively turns any computer into a tablet computer, the pattern is encoded over a transparent flat surface and this surface is laid over a computer screen. The optical pen determines, from the encoded pattern, the spatial coordinate of its tip and sends that information to the computer. Driver software then moves the mouse pointer to the appropriate position. If the pen tip touches the screen, the pen sends information indicating such contact to the computer. The encoded pattern could be used to gather further data, besides the coordinates. For instance, the rule-software could emulate a virtual keyboard or other software tools, such as a palette of drawing comments. In this embodiment, the pen does not use an ink reservoir.

In yet another embodiment, which turns a surface into a digital whiteboard, the pattern is encoded over a non-transparent surface on which an image of a computer screen is projected. The optical pen reads from the encoded pattern a spatial coordinate of its tip, and sends this information to the computer. Driver software then receives this information and moves the mouse pointer to the corresponding pen tip position. If the pen's tip touches the surface, the pen sends information concerning such contact to the computer. The encoded pattern could be used to gather further data, besides the coordinates. For instance, the rule-software could emulate a virtual keyboard or other software tools, such as a palette of drawing comments. In this embodiment, the pen does not use an ink reservoir.

The encoded pattern is almost invisible to human eyes since the dots are both small and limited in number. Moreover, they are covered by the projected image.

A similar embodiment could be made with a rear projection over a semi-transparent surface upon which a dot pattern has been encoded.

Another similar embodiment could be made without the screen projection. In this case, the user uses an inked pen over an encoded whiteboard. The user's pen strokes are then captured by a connected computer as described above.

The Optical Pen.

Figure 1:
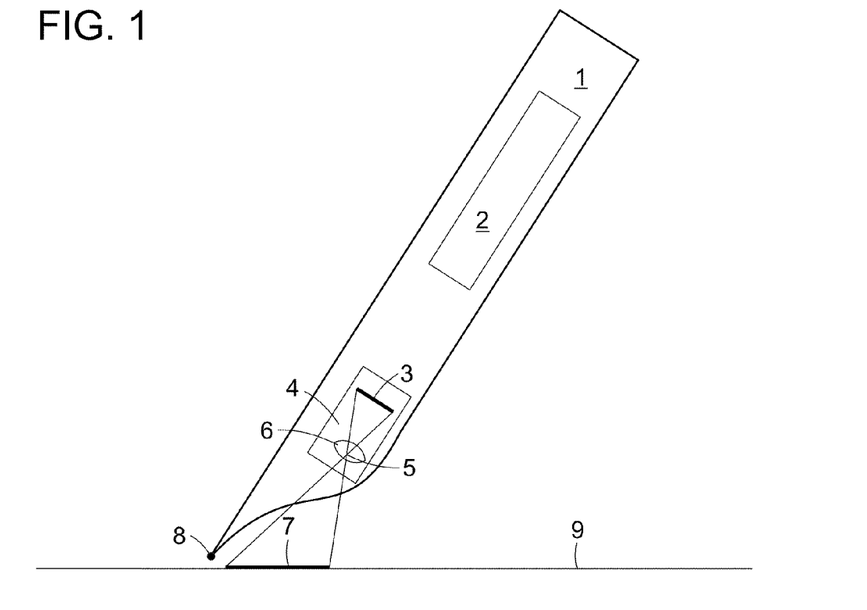
FIG. 1 shows a schematic view of an optical pen.
Figure 2:
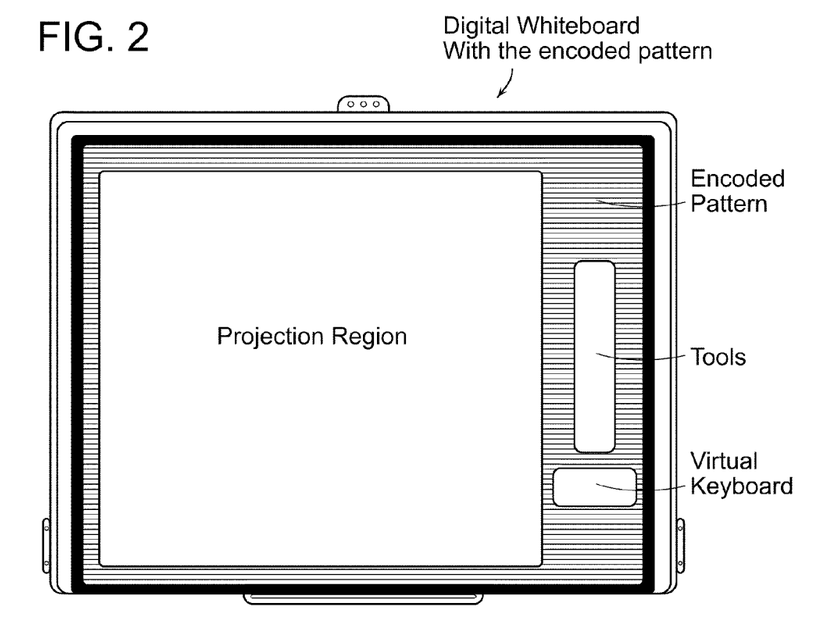
FIG. 2 shows a digital whiteboard that includes an encoded pattern.

Referring to FIG. 1, an optical pen 1, with or without an ink reservoir, includes a camera 4 installed therein. The camera 4 detects and captures an image at a location 7 on a surface 9 having an a dot code pattern encoded thereon. The camera 4 includes a lens assembly 6 and illumination means. The pen body 2 includes a processor or other sensors and hardware that provide the optical pen 1 with the ability to archive or transmit information relating to the detected image to another device like personal digital assistant (PDA), another pen, a telephone, and/or a computer using cable or wireless means for communication. The image captured by the camera 4 can be processed in the pen body 2 or on another device.

The camera 4 could be a infrared camera that captures an image of the surface 9 within the confines of a location 7 where the dot code can be found. In some embodiments, that image is analyzed in pen body 2, and using the information that is inside the dot code pattern the processor in the pen body 2 determines at least a spatial coordinate of the pen tip 8 relative to the surface 9. With that information, the processor can determine not only the orthogonal position of the pen tip 8 to the surface 9 but whether or not the pen tip 8 is touching the surface 9.

The Dot Code Pattern

Figure 3:
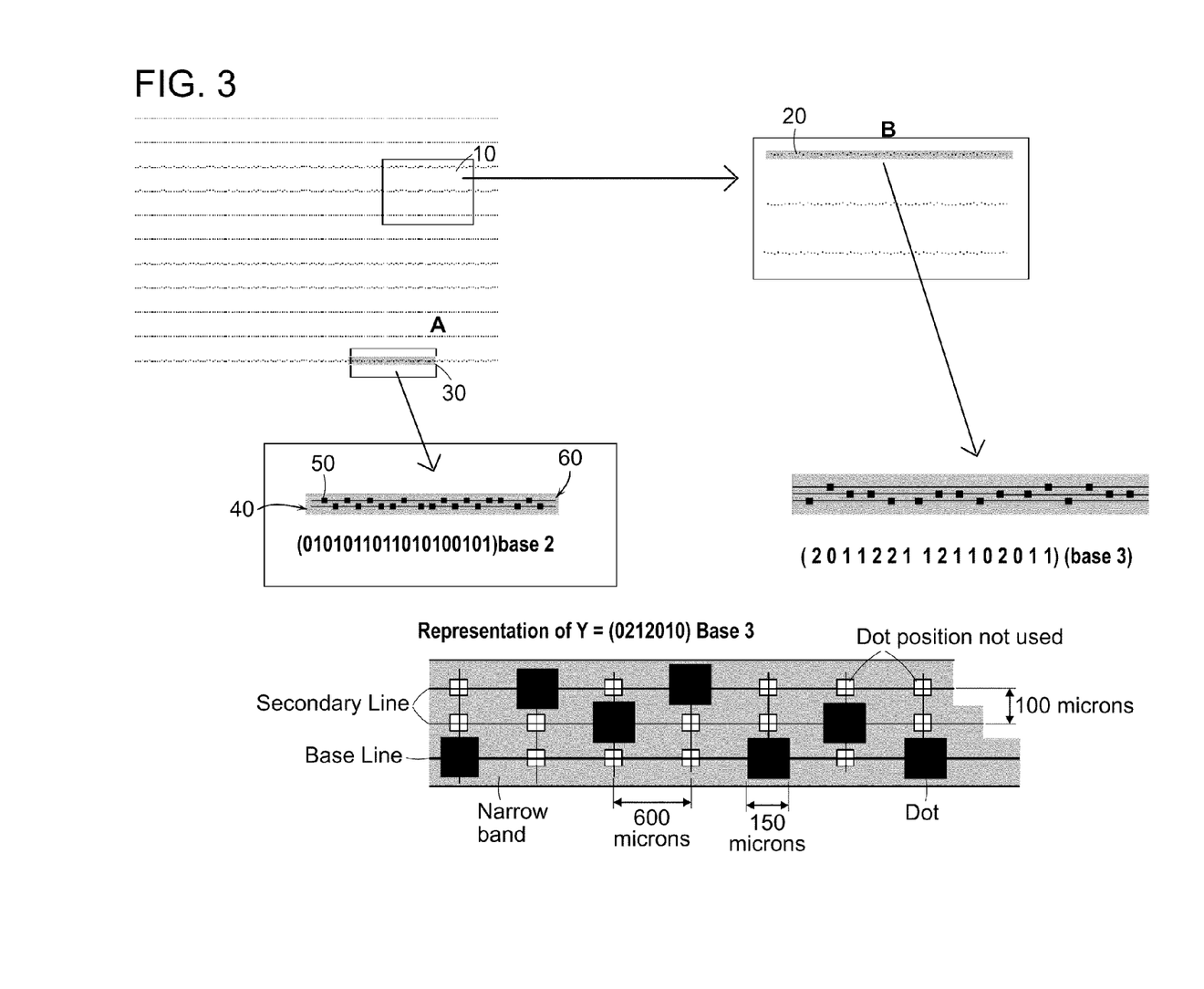
FIG. 3 shows a print medium object of the present invention.

The print medium in FIG. 3 includes a supporting base, such as a paper, a transparent/translucent plastic/glass, and a two-dimensional dot code pattern arranged continuously on the entire surface 9 of the supporting base. The dot code pattern is formatted as a sequence of narrow parallel bands 20, in each of which is a sequence of dots 50. The dots are arranged in a pre-determined position to represent a number at some base. The number could represent a line or/and column.

Figure 13:
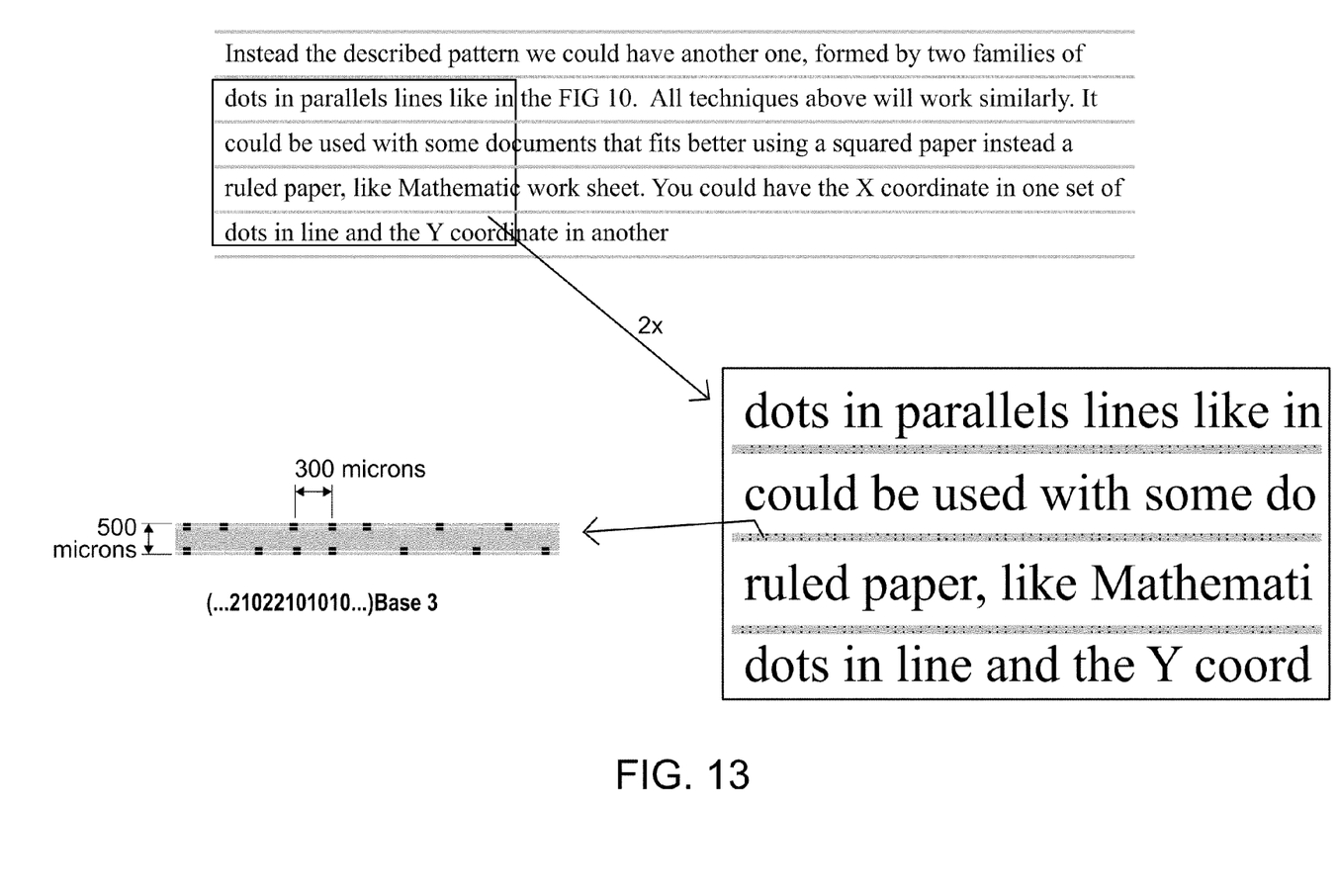
FIG. 13 is an alternative base 3 construction using only one secondary line.

Insert A in FIG. 3 shows a sample of a dot code pattern. The narrow band 20 extends along a base line 40 and a secondary line 60. The sequence of dots in FIG. 3 represent the number 0101011011010100101 in base 2, as shown in inset A using only a base line 40 and one secondary line 60, or 2011221121102011 in base 3, as shown in inset B using one base line 40 and two secondary lines 60. That number could represent a column or/and line number at that location. Another setting could use only one secondary line 60 and still using a base three numeration, as shown in FIG. 13.

The base 3 representation shown in FIG. 3 can be carried out with only one secondary line 60.

Suppose the distance between the base line 40 and the secondary line 60 is 300 microns, and the dot size is 100 microns, and the rule lines, in blue, are 500 microns wide. If the minimum distance between the dots in the same line is 300 microns, and if one uses X and Y with nine digits in base 3, one could use the resulting dot pattern for documents having as many as 273,934 A4 pages.

Additionally, this dot pattern and its associated reading process make it possible to obtain the spatial localization of the optical pen tip 8 relative to the surface base and if the optical pen tip 8 is touching the paper.

If one were interested in only the pen tip's position in a plane, and not its height from that plane, one need only have one narrow band 20 inside a frame. However, to improve precision, the camera 4 is set such that, at all scanning times, at least two segments from two distinct narrow bands 20 are included in the image.

The dot sizes and other measures, such as distances between features of the encoded dot pattern, depend on the kind of application for which the dot pattern is intended.

One application is to convert a typical computer, with a twenty-inch screen, into a tablet computer. In that case, one can place a transparent flat surface 9 encoded with the dot pattern in front of the computer's screen.

For the foregoing application, the distance between the orthogonal projection of the dots over the base line (centre of the band like line 40) is about 500-650 microns and the distance between parallel virtual lines (like lines 50 and 60) is constant at about 100-150 microns. Generally, the dot diameters would be 100-150 microns. This application usually works with IR camera 4. The dot size is selected so that the structures formed by the screen's physical pixels will appear as noise on the image frame of the camera 4. For screens larger than twenty inches, it may be necessary to use a bigger dot size to make such distinction.

Figure 4:
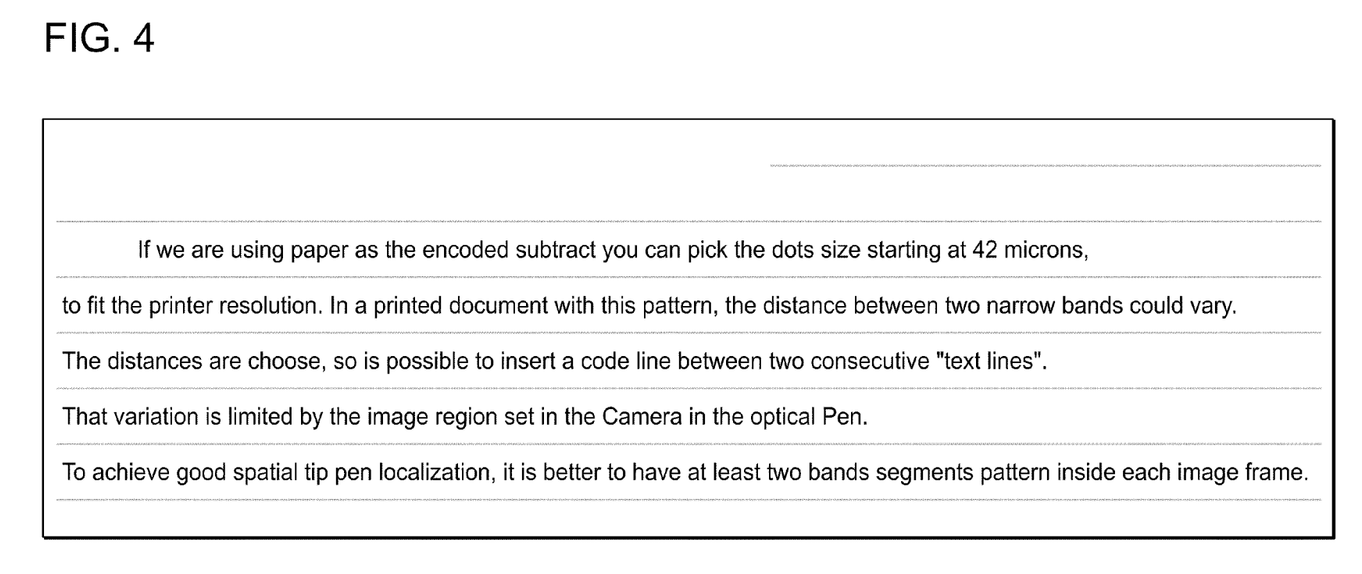
FIG. 4 shows a printed sheet of paper with text and dots as described herein.

Another application is that of encoding a printed sheet of paper with a dot pattern. In this application, where the encoded surface 9 is paper, the encoded subtract dot size can start at 42 microns to fit the printer resolution. On a printed document with this pattern, the distance between two narrow bands can vary. The distances are selected to make it possible to insert a code line between two consecutives "text lines". That variation is limited by the image region set in the camera 4 in the optical pen 1. To achieve good spatial tip pen localization, it is better to have at least two band segments pattern inside each image frame.

The Rule-software:

The rule-software prepares the document and dot code for concurrent printing. Printing the dot code and the document at same time ensures that both are aligned on the printed sheet. Thus, among the main functions of the rule-software is that of inserting a code pattern without disturbing document readability, and archiving a digital copy in which all user strokes with the optical pen 1 will are saved.

In operation, the rule-software opens the stored digital document and performs an image analysis in which it looks for spaces between the text lines, horizontal lines, and the presence of any pictures.

Figure 11:
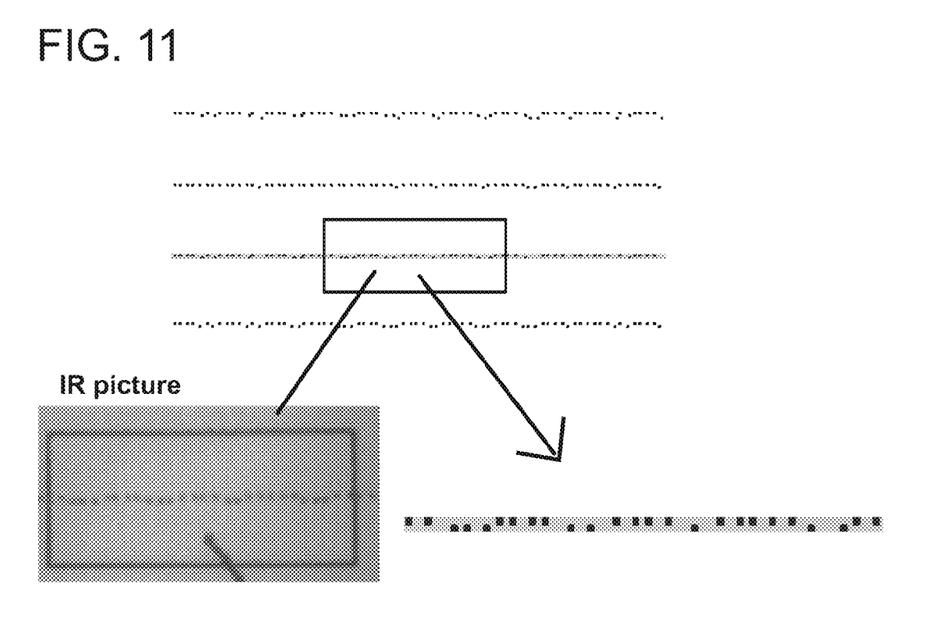
FIG. 11 is a representation of a way to disguise a dot CODE by surrounding it with an IR (infra-red) invisible ink.

The rule-software inserts the code pattern into blank spaces between lines of text. To enhance user comfort, the rule-software can surround dots with lines of IR invisible ink, like light blue, as shown in FIG. 11. If document has oriental characters, the horizontal lines can replaced with vertical lines.

Figure 5:
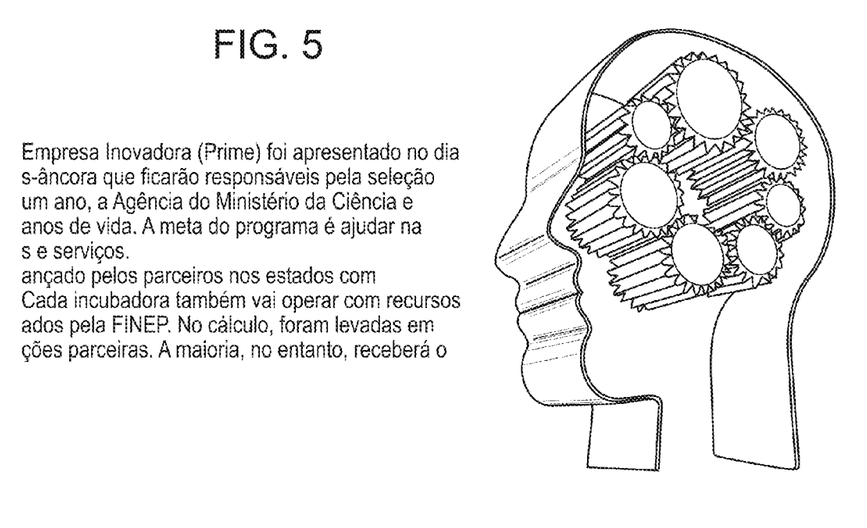
FIG. 5 shows a printed paper with text, dots and a figure, as described herein.

If, in the course of image analysis, the rule-software identifies horizontal lines, it can exchange those with encoded lines. If the rule-software finds a picture, as it would if it operated on the image shown in FIG. 5, it can either avoid the picture, or overwrite it, depending on how the user has configured the software.

On the top of the document, or at any convenient location, the rule-software can insert an extra dot code with some document information, such as a document identification number, that should be read by the optical pen 1. In those embodiments in which the optical pen 1 has a unique identification number, the software administrator could set up which pen is allowed to modify the digital document copy.

Reading the Dot Code:

What follows is a description of how the optical pen 1 reads the encoded pattern When the user movies the optical pen 1 across the surface 9, the camera 4 starts to take pictures of the pattern. It does so at a rate from 60 to 100 frames per second. Each picture generates a 320×240 pixel frame of eight-bit grayscale.

Each frame is then analyzed in four steps: localizing the dots in the dot patter, identifying the narrow band, reading the coordinates, and where necessary, identifying the surface plane.

Localization of the Dots.

Dot localization is carried out using a mask that fits the dots' images and misses almost all characters. This is carried out by a fast image identification algorithm and so can be done in real-time even with a low cost processor.

Figure 6A:
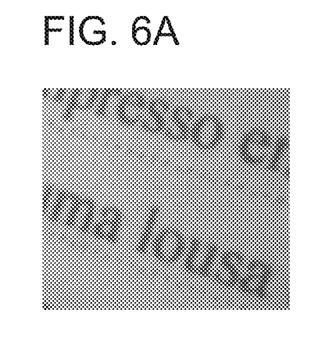
FIG. 6A shows a sample of a frame.
Figure 6B:
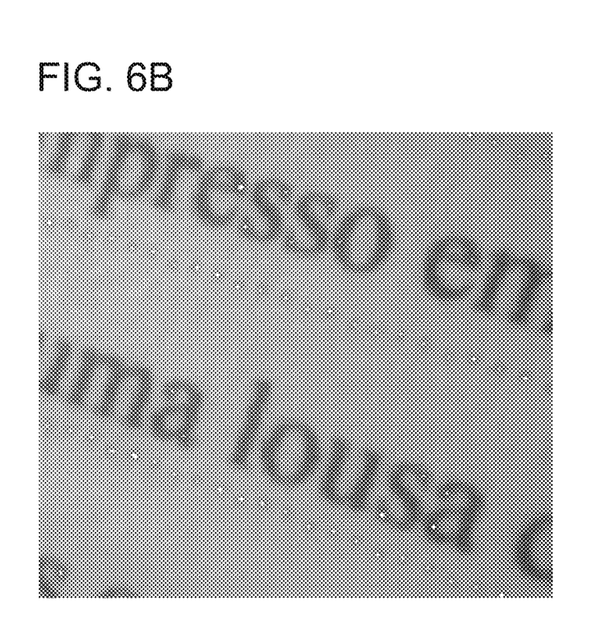
FIG. 6B shows light gray dots selected by that image identification algorithm within the frame of FIG. 6A.

FIG. 6A shows an exemplary frame. FIG. 6B shows light gray dots, a few of which appear in a text character, that are selected by that image identification algorithm.

Identification of the Narrow Band.

Of all directions of lines joining dots obtained above, the direction V of the narrow band 20 is the direction in which dots occur at the greatest spatial greater frequency. By looking for the projection of all localized dots onto a line normal to V, say N, then the set inside an expected interval (corresponding to the width of the narrow band 20) will be the set of dots inside that narrow band. Removing those dots from the localized set of dots and reapplying the method above, provides a way to identify dots in a second narrow band 20, and so on.

Another way to identify narrow bands 20 is to consider a graph in which vertices $P_i$ are dots and the edges are formed by pairs of dots. Given a pair of vertices, P1 and P2 one can determine whether the distance between them is between expected range limits, i.e. whether $$\text{LimitInf} < \text{Dist}(P1,P2) < \text{LimitSup}$$

where LimitSup and LimitInf are the expected range limits, and taking the connected compounds of this graph.

Reading the Coordinates.

If one were to study the dots within a narrow band 20 in a frame by looking the frame's base coordinate (V, N) it is possible to localize the frame in the encoded surface 9.

For instance, if the encode line represents the position by a sequence of dots . . . (X, (Y−1)), (X, (Y)), (X, (Y+1)) . . . using a six bit binary representation for X and Y, in the surface coordinates, if there are 24 known dots it is possible to extract, using a simple algorithm and the X and Y values, which dot in this band is the starting dot of X and in which direction Y increases.

There are other more efficient ways to represent the surface coordinate. Some of these are described in the section entitled "NOTE 2" below.

Localizing the Surface Plane.

Figure 7:
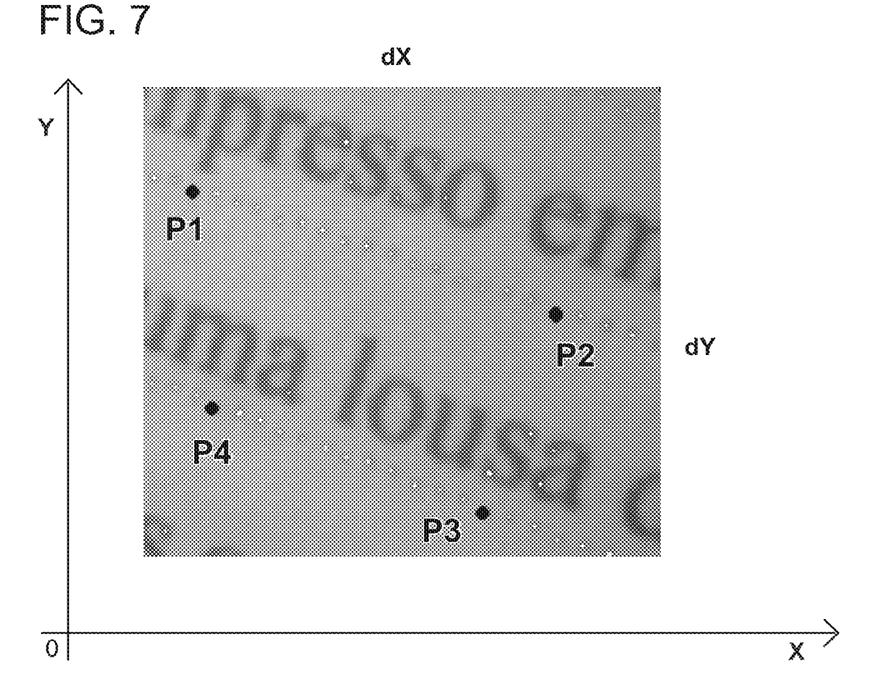
FIG. 7 shows a representation of a surface plane.

Consider the base (0,x,y,z) where (0,x,y) is the base of the image plane in the camera 4 and z is the normal to that plane such that the focal point is (dX/2,dY/2,c) where dX and dY are the image resolution (for example dX=320 and dY=240) and c is an arbitrary value. The procedure begins by picking four images of dots in the frame, say P1, P2, P3 and P4 where P1 and P2 are in base line 40 and P3 and P4 are in another base line 40, as shown in FIG. 7.

Let R1, R2, R3 and R4 be points in the surface 9 corresponding to images P1 . . . P4.

Figure 8:
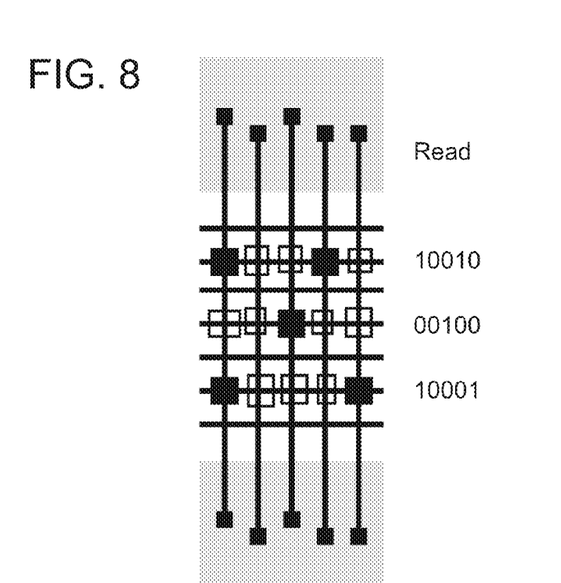
FIG. 8 shows how one could check, at a specific position on the surface, whether there is or not a dot.

Applying some geometry consideration and knowing the distance between R1 and R2 (for example, by counting the number of dots between P1 and P2) it is possible to locate the plane in the base (0,x,y.z). Since the camera 4 can read the R1 absolute position in that surface 9 it is possible to recognize the application surface from the image plane (and its inverse) which defines the image. The application is necessary to read further information from the image. For example, one could check at a specific position on the surface 9 whether or not a dot is present as binary information, as suggested by FIG. 8.

In some cases, it is possible to allocate unused lines without any IR visible text among them, such that the camera 4 will look for dots among those lines to read ancillary binary information, such as a document ID.

Since the position of the pen tip 8 relative to the base (0,x,y,z) can be determined by factory calibration, it is possible to know the position of the pen tip 8 position relative to the surface 9. Thus, one can optically determine the position of the pen tip 8 relative to the surface 9. If that distance is zero, the pen 1 sends that information to the computer, which can be used to trigger a mouse-down event.

The Data Transition:

The information gathered from the optical pen 2 needs to be transmitted in real time or archived for late transition. To do so requires a codec to deal with the minimal amount of data. The bulk of the data to be transmitted/archived from the pen 2 would be the position of the pen tip 8, which is transmitted at a rate of about 60-100 times per second.

Instead of sending the position of the pen tip 8 every time, it is possible to send an initial value and a difference between the last position and the current position, until the pen 1 stops moving, at which point a new position can be transmitted. During tests, it was observed that the vector difference has an absolute value of less than 8 so we can map a neighborhood of (0,0) say "Nset" into the set with 8 bits (0 . . . 255). This means that instead of sending or archiving a new position it is only necessary to send or archive an eight bit character.

If a function F maps from the neighborhood Nset to a set of $2^8$ integers {0,1,2 . . . 255} the difference between previous and current position is (x,y) it is only necessary to send or archive the function F(x,y) so that current absolute position of the pen tip 8 will be:

$$(\text{Last\_position}) + F^{-1}(F(x,y))$$

Figure 9:
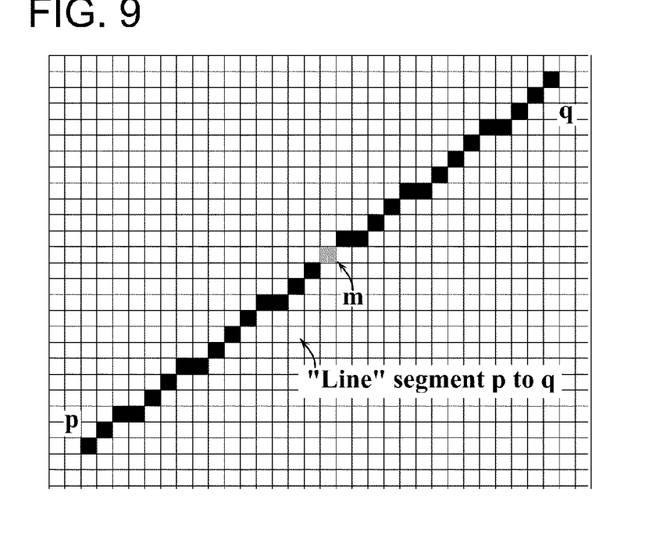
FIG. 9 is the representation of when the difference p–q is out of the Nset.

If the difference p−q is outside of the neighborhood Nset, it is possible to split the difference into two or more parts, so that each piece lies within the neighborhood Nset as suggested by FIG. 9.

Figure 10:
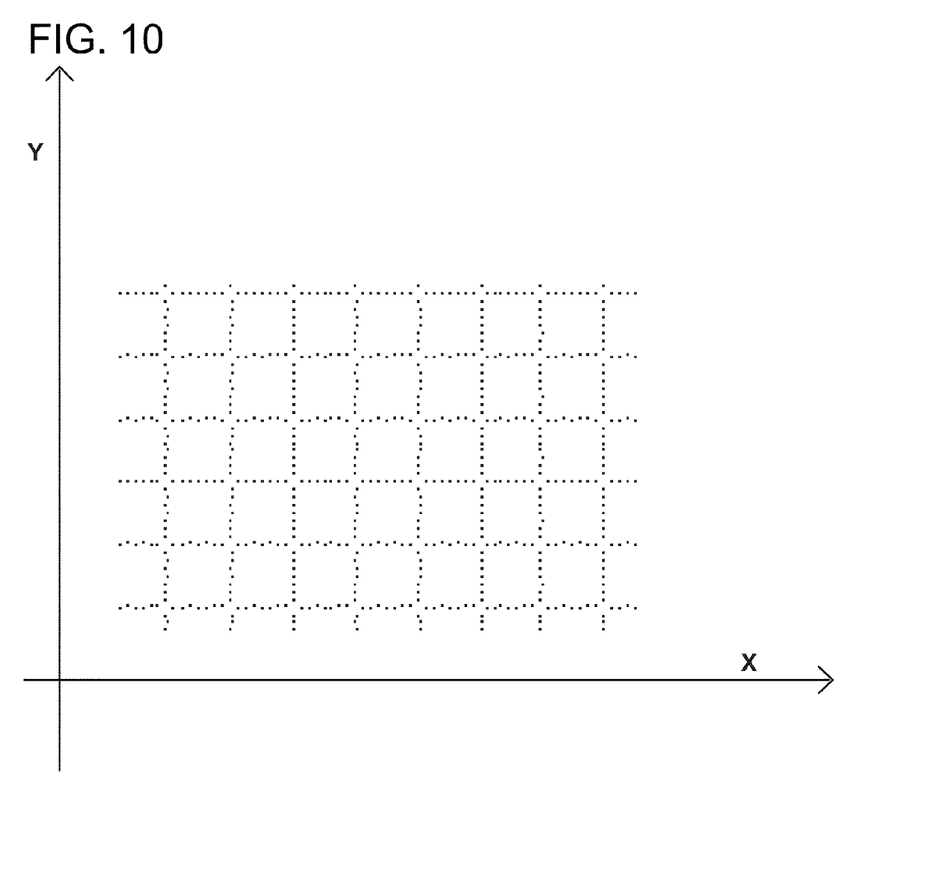
FIG. 10 is an alternative dot code pattern.

Alternative Dot Code Pattern:

Instead of the described pattern, one could have a dot pattern formed by two families of dots in parallel lines like as shown in FIG. 10. All techniques above will work similarly. This could be used with certain kinds of documents such as squared or quadruled paper instead a ruled paper. In such an embodiment, an X coordinates can be in one set of dots on a line and the Y coordinates can be in the orthogonal line.

Notes:

NOTE 2—Since we use two band segment to determine the surface plane position, as a sample, we could construct the dot CODE lines by setting one line . . . Y−1,Y, Y+1, . . . and the line below as the same but moved ONE dot to its left (cyclically) in the next line we repeat the line . . . Y−1,Y,Y+1, . . . them the next below we move TWO dots to its left (cyclically) and so on. See FIG. 12.

Figure 12:
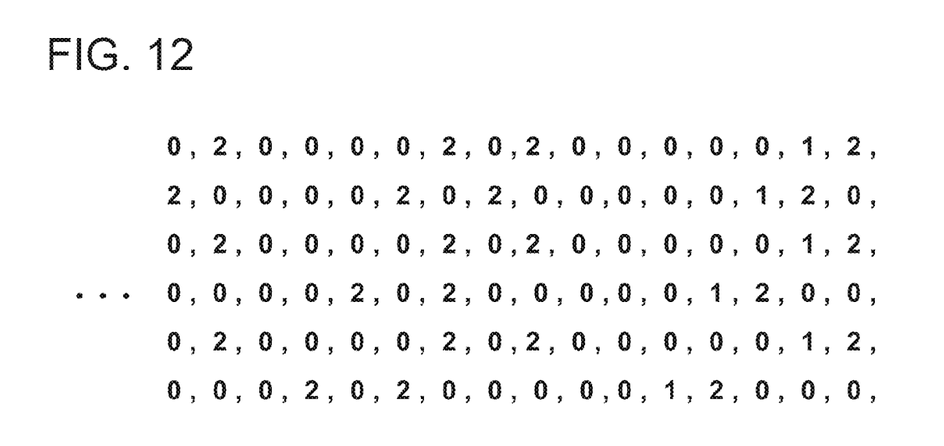
FIG. 12 is a representation how dot codes in successive lines are shifted versions of dot codes in preceding lines.

That construction has the advantage to give us the orientation of the lines, allowing a double check of that (so "bellow" has a meaning here).

If we want a large number of distinct A4 pages we could take a sequence

. . . F(Y−1)F(Y)F(Y+1) . . . Instead . . . (Y−1) Y(Y+1) . . . Where the function F is any permutation of some subset of the "Y" Range. For example if we use a 12 bits number code representation this subset could be any integer form 1 to 4093=2^12−3. Since 4093 is a prime number F(y)=key0*y Mod(4093) is a permutation in this subset, for any fixed integer key0 of this subset.

If we set the dots 400 microns apart than any such 12 bits number will take 4.8 millimeter so the "Y line" will be 4.8×4093 mm long or about 1965 centimeter long.

Doing the same construction we create the "X line" by . . . G(X−1)G(X) G(X+1) . . . where G is another permutation in integer subset 1 to 4093 say G(x)=key1*xMod(4093).

Now we create a map with area of 1965×12×4093 (square centimeter), by putting first a Y line the copy of a X line apart of (say) 5 mm. Next, again apart 5 mm we repeat the same Y line and the X line but this time we move the X line cyclically Mod(4093) 1 bit to right side. Again we put a par of Y line and X line this time we move the X line cyclically 2 bits and so on. We can do that 12×4093 times and each time adding another 1×1965 cm² area in this map. In the end we get a total area of 1965×12×4093=96512940 cm² map. We will have a total of 2×12×4093 lines in this map with 4093 columns If we are in some line in the first bit of a 12 bits number. The columns position will be the Y value in the "Y line" and line position will be 2× (displacement −1) or 2× displacement or 2× displacement−1 depending if we are above a Y line or in the Y line or below a Y line (respectively). Where "displacement" is the number of bits that the X line displaced from the Y line. It easy to see that if you knowing 24 consecutives bits you will be able to know the starting bit of a 12-bit number so you can calculated the number and the displacement.

If we use a key0 being a even value for X line and key1 as odd number for Y line you can have (4092)/2×(4094)/2 distinct maps of 1965×12×4093 (square centimeter) area. The value of key0 and key1 can be find (break the key) using less than 50 frames (less than ½ seconds if we are working with 100 frames per seconds) since there is few key's that obey the sequence . . . F(Y−1)F(Y)F(Y+1) . . . and key0 and key1 is always in this set. The "key breaking" is done once, when the user starts working in a new document and it is done again only when the key0 and key1 is not the right keys.

So in the end we have 4092×4094×1965×3×4093 square centimeters total area. Since a A4 page is a 21×29.7 cm² we can have 6.48×10¹¹ distinct A4 pages or 648 billions of distinct A4 page that is enough number of active pages to kept in a enterprise server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of printing an absolute position code on a surface using an electronic printer, the method comprising:
using an electronic printer, printing an absolute position code on a surface that codes a plurality of absolute positions on said surface, said absolute position code comprising a plurality of bands, each of said bands including a plurality of parallel dotted lines and being arranged in parallel with the others of the plurality of bands, wherein said parallel dotted lines comprise a sequence of graphical marks,
wherein each graphical mark of each of said bands is located at a predetermined displacement from a base line of said band, said predetermined displacement representing a value indicated by said graphical mark in a predetermined number base such that the graphical marks of said band represent a sequence of distinct numbers,
wherein any two consecutive bands are spaced apart from each other by a predetermined value, and
wherein for any two consecutive bands, each number of the sequence of distinct numbers of a first of said two consecutive bands codes an absolute row position of one of said plurality of absolute positions on said surface and each number of the sequence of distinct numbers of a second of said two consecutive bands codes an absolute column position of one of said plurality of absolute positions on said surface.

2. The method of claim 1, wherein said sequences of distinct numbers that represent an absolute column position are fixed from a first predetermined sequence and said sequences of distinct numbers that represent an absolute row position are cyclically rotated from a fixed second predetermined sequence.

3. The method of claim 2, wherein said first predetermined sequence is a sequence obtained by a first predetermined permutation of a set of natural numbers {0 . . . N}, in which N is a predetermined number, and said second predetermined sequence is a sequence obtained by a second predetermined permutation of said set of natural numbers {0 . . . N}.

4. A method comprising
determining an absolute position of an arbitrary partial surface of a predetermined size and shape on a surface on which an absolute position code has been printed as recited in claim 1,
wherein determining said absolute position comprises
identifying positions of all graphical marks on said partial surface,
finding a first base line and a first subset of all graphical marks having more than a first predetermined number of elements, wherein said first base line approximates positions of graphical marks that are elements of said first subset to within a predetermined error limit,
finding a second base line and second subset of all graphical marks having more than said second predetermined number of elements, wherein said second base line approximates positions of graphical marks that are elements of said second subset to within said predetermined error limit, wherein said second base line is adjacent to said first base line, using displacements, relative to said first base line, of said positions of said graphical marks in said first subset,
determining a first subsequence of digits, using displacements, relative to said second base line, of said positions of said graphical marks in said second subset,
determining a second subsequence of digits, and
using said first and second subsequences of digits, determining said absolute position of said partial surface on said surface.

5. An apparatus comprising
a sensor for producing an image of a partial surface of a surface having an absolute position code provided thereon, and
an image processor configured to calculate based on a subset of said absolute position code which is to be found in said image of said partial surface a position of said partial surface, said image processor being configured to determine an absolute position of said partial surface by executing the method of claim 4 to determine the absolute position of said partial surface.

6. The apparatus of claim 5, wherein said sensor and said image processor are housed in an optical pen.

7. The apparatus of claim 5, further comprising means for wireless transmission of said position determination.

8. A manufacture having encoded thereon an absolute position code as recited in claim 1.

9. A non-transitory computer-readable medium having encoded thereon software comprising instructions for executing the method of claim 1.

10. A non-transitory computer-readable medium having encoded thereon software comprising instructions for executing the method of claim 4.

11. The method of claim 4, wherein said first base line is a linear approximation of the positions of graphical marks that are elements of said first subset with said predetermined error limit.

12. The method of claim 1, wherein said predetermined displacement represents said value only with reference to displacement of said graphical mark in a single direction from said base line.

13. The method of claim 12, wherein the single direction is perpendicular to a direction of said parallel dotted lines.

14. The method of claim 1, wherein said predetermined displacement represents said value with reference to the base line and not with reference to any others of the graphical marks.

15. The method of claim 1, wherein the base lines of each of said bands are virtual lines.

16. A system comprising:
a substrate having an absolute position code formed thereon,
   wherein the absolute position code codes a plurality of absolute positions on said substrate, said absolute position code comprising a plurality of bands, each of said bands including a plurality of parallel dotted lines and being arranged in parallel with the others of the plurality of bands, wherein said parallel dotted lines comprise a sequence of graphical marks,
   wherein each graphical mark of each of said bands is located at a predetermined displacement from a base line of said band, said predetermined displacement representing a value indicated by said graphical mark in a predetermined number base such that the graphical marks of said band represent a sequence of distinct numbers,
   wherein any two consecutive bands are spaced apart from each other by a predetermined value, and
   wherein for any two consecutive bands, each number of the sequence of distinct numbers of a first of said two consecutive bands codes an absolute row position of one of said plurality of absolute positions on said substrate and each number of the sequence of distinct numbers of a second of said two consecutive bands codes an absolute column position of one of said plurality of absolute positions on said substrate;
an optical pen having a camera therein configured to capture an image of at least a portion of the substrate and at least a portion of the absolute position code; and
a processor configured to determine, from the portion of the absolute position code captured in the image, an absolute position on the substrate at which a tip of the optical pen was positioned when the image was captured.

* * * * *